US011755483B1

(12) United States Patent
Denthumdas et al.

(10) Patent No.: US 11,755,483 B1
(45) Date of Patent: Sep. 12, 2023

(54) SYSTEM AND METHODS FOR REDUCING GLOBAL COHERENCE UNIT SNOOP FILTER LOOKUP VIA LOCAL MEMORIES

(71) Applicant: Marvell Asia Pte Ltd, Singapore (SG)

(72) Inventors: Pranith Kumar Denthumdas, San Jose, CA (US); Rabin Sugumar, Sunnyvale, CA (US); Isam Wadih Akkawi, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/826,757

(22) Filed: May 27, 2022

Related U.S. Application Data

(63) Continuation of application No. 17/086,314, filed on Oct. 30, 2020, now Pat. No. 11,379,370.

(60) Provisional application No. 63/007,223, filed on Apr. 8, 2020.

(51) Int. Cl.
  *G06F 12/0831* (2016.01)
  *G06F 12/0811* (2016.01)
  *G06F 12/0813* (2016.01)
  *G06F 12/0817* (2016.01)
  *G06F 13/16* (2006.01)

(52) U.S. Cl.
  CPC ...... *G06F 12/0831* (2013.01); *G06F 12/0811* (2013.01); *G06F 12/0813* (2013.01); *G06F 12/0828* (2013.01); *G06F 13/1668* (2013.01)

(58) Field of Classification Search
  None
  See application file for complete search history.

(56) References Cited

U.S. PATENT DOCUMENTS

2014/0310468 A1\* 10/2014 Speier ................. G06F 12/0811
                                                711/135

FOREIGN PATENT DOCUMENTS

EP             1113249 B1    10/2010

\* cited by examiner

*Primary Examiner* — Charles J Choi

(57) ABSTRACT

In a multi-node system, each node includes tiles. Each tile includes a cache controller, a local cache, and a snoop filter cache (SFC). The cache controller responsive to a memory access request by the tile checks the local cache to determine whether the data associated with the request has been cached by the local cache of the tile. The cached data from the local cache is returned responsive to a cache-hit. The SFC is checked to determine whether any other tile of a remote node has cached the data associated with the memory access request. If it is determined that the data has been cached by another tile of a remote node and if there is a cache-miss by the local cache, then the memory access request is transmitted to the global coherency unit (GCU) and the snoop filter to fetch the cached data. Otherwise an interconnected memory is accessed.

12 Claims, 3 Drawing Sheets

SYSTEM AND METHODS FOR REDUCING GLOBAL COHERENCE UNIT SNOOP FILTER LOOKUP VIA LOCAL MEMORIES

CROSS-REFERENCE TO RELATED APPLICATIONS

This application claims the benefit and priority to the U.S. Nonprovisional patent application Ser. No. 17/086,314, filed on Oct. 30, 2020, which claims the benefit and priority to the U.S. Provisional Patent Application No. 63/007,223, filed Apr. 8, 2020, all of which are incorporated herein in their entirety by reference.

BACKGROUND

In some systems, such as a multi-socket/node system, the storage address space may be shared among various nodes of the system. Accordingly, an address line (e.g., data stored at an address) that is local to one node may be cached by a remote node. As such, storage/memory coherency among different nodes becomes an issue. In some conventional systems, a Global Coherence Unit (GCU) is used to maintain memory coherency among different nodes. The GCU may include a snoop filter that tracks cache lines that are remotely cached.

A cache line access request can be sent from a tile within a node to its GCU to determine if an address line has been cached at another/remote node. The GCU is configured to look up the snoop filter to determine whether the address line is remotely cached as a cache line or not. If the line is not remotely cached, then a request may be sent to a memory component, e.g., dynamic random access memory (DRAM), to fetch the address line and cache the line locally.

Tiles within the same node share the same GCU. Accordingly, every time that there is a request, each tile sends a request to the GCU to look up the snoop filter whether the line has been cached by a remote node. As a result, numerous requests from different tiles to the GCU may cause a communication bottleneck at the GCU. Moreover, each request takes a roundtrip from the tile to the GCU and costs tens of clock cycles, thereby resulting in a slow response.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
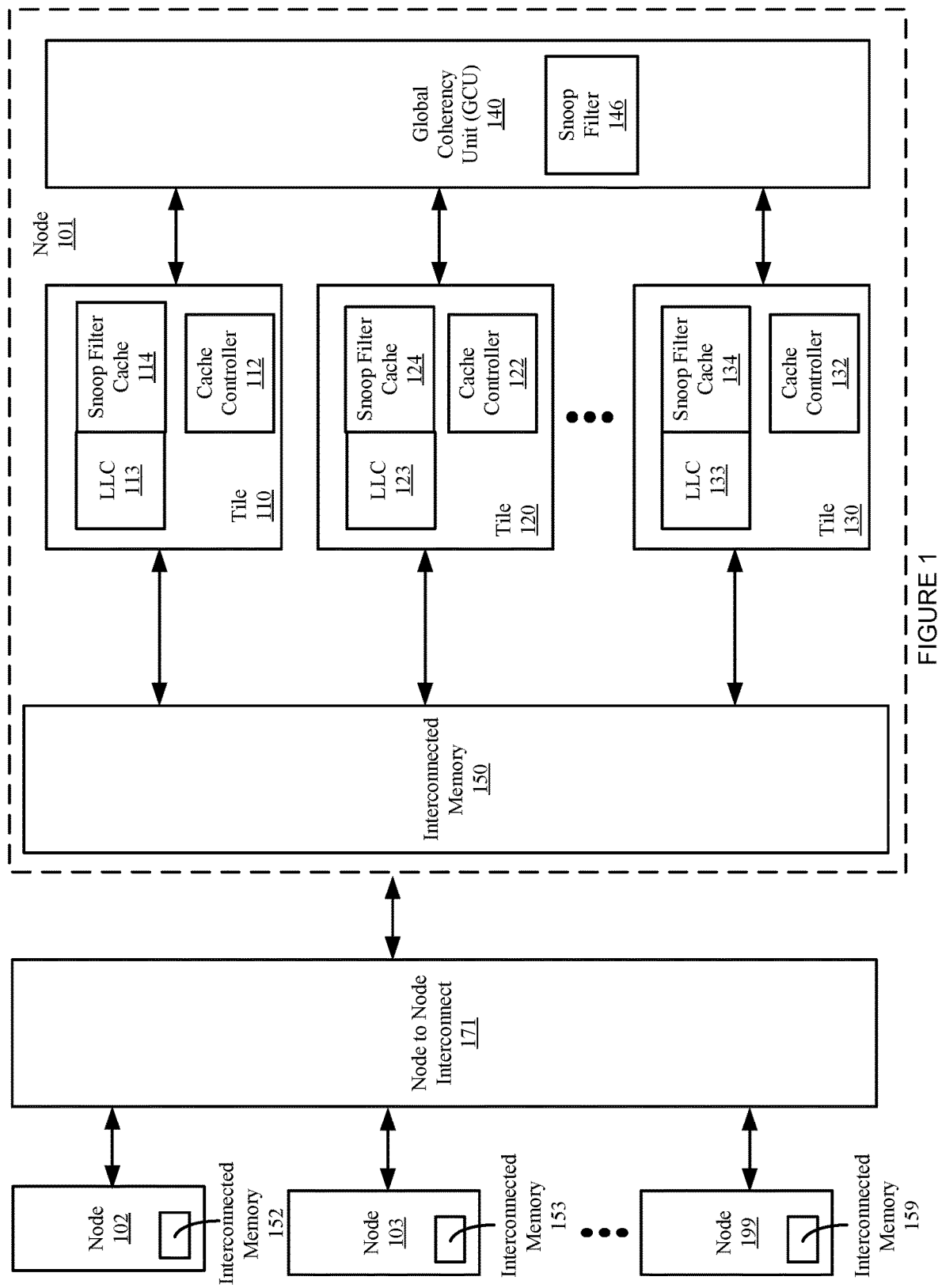
FIG. 1 depicts an example of a diagram of a hardware-based architecture for reducing global coherence unit snoop filter lookup according to an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

Multi-core processors implemented on a semiconductor die and placed within a semiconductor package are commonly deployed in personal computers, servers, mobile phones and in various embedded applications. A multi-core processor includes many computing units (known as cores) connected together through an on-die interconnection network. In many designs such multi-core processors share a cache that is also connected to the interconnection network. Such a shared cache may be a Level 1 cache, or a Level 2 cache, or a Level 3 cache, etc., depending on the design of the core and the number of cache levels that each core supports. The shared cache that is connected to the interconnect network may be referred to as the last level cache (LLC). In many designs such an LLC is physically broken up into LLCs within the multiple tiles that are physically distributed across the semiconductor die. Each address maps to one and only one of the LLC tiles. Throughout the application, the tile that an address maps to is referred to as the home tile for that address. Any request to that address from any of the cores is sent to the home tile for that address. Coherence controllers are typically co-located with the LLC. The coherence controller in a tile manages coherence of cache lines that have the tile as their home tile. Interconnected memory (all memory) usually in the form of Dynamic Random Access Memory (DRAM) is attached to the semiconductor package. Note that in such a design, the LLC may be of any suitable size depending on the needs of the deployment and there are deployments where the LLC is of zero size, i.e., absent.

A subset of multi-core processor deployments include more than one semiconductor package connected through a package to package interconnect, where a computing unit on one package may access DRAM on the other packages through the interconnect. Each semiconductor package is referred to as a node. It is appreciated that in some nonlimiting examples, a node may be a die within a semiconductor package. A node is referred to as the home node for addresses that map to DRAM that is directly attached to that node. In such multi-node deployments, a node may access an address associated with DRAM on a different node and cache it locally. To handle data consistency in such scenarios where remote addresses are cached, the home node of an address maintains structures such as a directory or snoop filter to track the address. When an address is provided by the home node to a remote node, the home node sets a marker in the tracking structure. When the address is released by the remote node, the home node removes the marker from the structure. The directory or snoop filter may be located centrally in a separate coherence controller block on the multi-processor die that we refer to as the Global Coherency Unit (GCU). Each node has its own GCU which tracks addresses from that node that are remotely cached.

Even though remote accesses where a node reads or writes to DRAM attached to a different node are permitted, the latency of such accesses may be high. So applications make every effort possible to restrict accesses from a node to DRAM attached to the node and perform remote accesses as infrequently as possible. However, since at any point in time any DRAM address may have been provided to another node, even on local accesses the GCU needs to be checked to determine if the address being accessed is remotely cached. Lookups to the GCU may thus be significantly higher than actual remote accesses and in many cases the GCU itself becomes a performance bottleneck. This disclosure provides a solution to the problem where a GCU gets overloaded by using a snoop filter cache in each tile, which caches information from the GCU. When an address is found in the snoop filter cache, a lookup of the GCU is avoided.

Accordingly, the number of lookups to the snoop filter residing at the GCU is reduced, which reduces number of roundtrips to the GCU, and helps to avoid communication bottleneck at the GCU. Furthermore, since the number of requests from a plurality of tiles to the GCU and responses from the GCU to the plurality of tiles are reduced, tens of clock cycles can be saved for each lookup request/response that is eliminated.

In some embodiments, each node may include a plurality of tiles and each tile may include a cache controller, an LLC (e.g., L3 cache), and also a snoop filter cache. It is appreciated that each node may include a core/processor to process data. The cache controller, in response to a memory access request by a home tile, checks the LLC within the home tile to determine whether the data associated with the memory access request has been cached by the LLC of the home tile. If there is a cache hit, then the cached data from the LLC is returned. However, if there is a cache miss, then (either sequentially or in parallel to checking the LLC) the snoop filter cache within the home tile is checked to determine whether any other tile at a remote node has cached the data associated with the memory access request by the home tile. In other words, the snoop filter cache locally tracks the snoop filter of the GCU for the node to determine whether any other tile at a remote node has accessed and cached the same data, e.g., cache line, associated with the memory access request from the home tile.

The snoop filter cache, however, does not result in a false negative result by indicating that a line is not cached in the tile of a remote node when it is. If it is determined that the data has been cached by another tile of a remote node, then the memory access request is transmitted to the GCU and the snoop filter within the GCU in order to fetch the cached data.

In some embodiments, the snoop filter cache within each tile caches "absent state" for tracking whether the data has been cached by another tile of a remote node. In other words, a cache hit by the snoop filter cache indicates that the data is not cached by a tile of a remote node and a cache miss indicates that the data may be cached by a tile of a remote node. Accordingly, the memory access request is transmitted to the snoop filter of the GCU only when it is determined that the data may have been cached by a remote node, thereby saving many clock cycles and reducing bottleneck at the GCU. It is appreciated that caching the "absent state" as discussed throughout this application is for illustrative purposes and should not be construed as limiting the scope of the embodiments. For example, in one nonlimiting design implementation, the snoop filter cache caches the "present state" for tracking whether the data has been cached by another tile of a remote node (i.e. a cache hit by the snoop filter cache indicates that the is cached by a tile of a remote node and a cache miss indicates that the data is not cached by a tile of a remote node).

It is appreciated that in some embodiments, the snoop filter cache may result in false positives for the existence of a line cached at another tile under a remote node. This is because the snoop filter cache mirroring the snoop filter of the GCU tracking remotely cached lines via a counter to indicate the possible presence/absence of a cached line at other tile(s) of remote nodes. As such, it is possible that the line may not have been actually cached at the another tile, even when there is a hit (or miss) in the snoop filter cache.

In one nonlimiting example, if it is determined by the GCU that the data has not been cached by another tile of a remote node, then the current memory access request is the first time the memory location and data associated therewith is going to be accessed. It is appreciated that in some examples, the memory location could have been accessed earlier and evicted and as such it is treated as if it is the first time that the memory location and data associated therewith is being accessed. Thus, the tile transmits the memory access request directly to the interconnected memory in order to fetch the data.

In some embodiments, if the GCU response including snoop filter hit/miss information indicates that the remote node does not have the line cached, a new entry is inserted into the snoop filter cache of the home node, indicating absence of line at the remote node. In some nonlimiting examples, the new entry in the snoop filter cache is created by the controller of the home tile. As such, the presence/absence of entries within the snoop filter within the GCU is locally tracked by the snoop filter cache of the home tile.

FIG. 1 depicts an example of a diagram of a hardware-based architecture for reducing global coherence unit snoop filter lookup according to an aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, an architecture includes nodes 101, 102, 103, . . . , and 199 that are connected to one another through node to node interconnect 171. Each node has its corresponding interconnected memory that it is physically coupled to, however, interconnected memory of one node is logically accessible by another node. In this nonlimiting example, node 101 has a corresponding interconnected memory 150, e.g., a DRAM. It is appreciated that other nodes, e.g., nodes 102, 103, . . . , 199, may logically access the interconnected memory 150 even though interconnected memory 150 is physically connected and associated with node 101. Similarly, node 102 has a corresponding interconnected memory 152, node 103 has a corresponding interconnected memory 153, . . . , and node 199 has a corresponding interconnected memory 159.

Each node may include a plurality of tiles and a GCU. For example, node 101 includes a plurality of tiles 110, 120, . . . , 130 that are coupled to a GCU 140 and the interconnected memory 150. It is appreciated that nodes 102, 103, . . . , and 199 each may have a structure similar to that of node 101.

It is appreciated that the number of nodes and tiles within each node, as described, is for illustrative purposes only and not intended to limit the scope of the embodiments. It is further appreciated that each node may include a plurality of tiles, each tile covering a range of memory addresses. For a non-limiting example, node 101 includes tiles 110, 120, and 130, each covering a range of memory addresses that do not overlap with one another. It is also appreciated that tiles from different nodes, may however have overlapping range of memory addresses. In other words, an address space range may be shared among tiles in different nodes (sockets). A memory line not cached locally on one tile (home tile) of a node (i.e. home node) may be remotely cached by a remote node. Each of these components in the architecture may be a dedicated hardware block/component programmable by a user at a host (not shown) via software instructions for various operations. When the software instructions are executed, each of the hardware components becomes a special purposed hardware component. In some embodiments, the architecture 100 is on a single chip, e.g., a system-on-chip (SOC).

In the example of FIG. 1, the tiles 110, 120, and 130 may be any processor tile. Moreover, it is appreciated that the number of tiles and nodes shown are for illustrative purposes and should not be construed as limiting the scope of the embodiments. For example, an n-number of tiles and n-number of nodes may be used.

It is appreciated that according to some embodiments, each tile may include a cache controller, an LLC associated with the cache controller, and a snoop filter cache. As a non-limiting example, tile 110 may include the cache controller 112, LLC 113, and the snoop filter cache 114. Tile 120 may include the cache controller 122, LLC 123, and the snoop filter cache 124. Tile 130 may include the cache controller 132, LLC 133, and the snoop filter cache 134. It is appreciated that the LLC may be within the cache controller. In some embodiments, the snoop filter cache may be an SRAM.

In the example of FIG. 1, the tiles 110, 120, and 130 are communicatively coupled to the GCU 140. The GCU 140 includes a snoop filter 146. It is appreciated that when there is a memory access request, e.g., a DRAM request, the cache controller for that tile checks the LLC associated with that tile to determine whether data associated with the memory access request has been cached or not (within that tile). If there is a cache hit in the LLC, then the data can be fetched locally and the memory access request is prevented from being sent to the GCU 140, its snoop filter 146, or to the interconnected memory 150. For example, when a memory access request is generated in tile 110, the cache controller 112 checks the LLC 113 to determine whether the data associated with the memory access request has been previously cached by tile 110. If there is a cache hit then the cached data is returned from the LLC 113 and the memory access request is prevented from being sent to the GCU 140, its snoop filter 146, or the interconnected memory 150.

If there is an cache miss, then (sequentially or in parallel with LLC lookup) the cache controller 112 checks the snoop filter cache 114 to determine whether the same memory location has been previously accessed and cached by another tile of a remote node, e.g., node 102, node 103, . . . , node 199. The snoop filter cache 114 caches absent state for tracking whether the data has been cached by another tile of a remote node. In other words, a cache hit by the snoop filter cache 114 indicates that the data is not cached by a tile of a remote node and a cache miss indicates that the data is cached by a tile of a remote node. The snoop filter cache 114 determines whether the data is cached by a remote node by tracking the snoop filter 146 of the GCU 140 (i.e. an entry within the snoop filter cache 114 indicates absence of entry in the snoop filter 146 and hence absence of that data being cached by a remote node and vice versa). Accordingly, if an entry within the snoop filter cache 114 is found, then that is an indication that the memory location has not been cached by a tile of a remote node, e.g., node 102, node 103, . . . , node 199. Instead of sending the request to the snoop filter 146 of the GCU 140 and waiting for a response, the request is sent from the tile 110 to the interconnected memory 150 to fetch the data. Accordingly, no request is sent from the tile 110 to the snoop filter 146 of the GCU 140, saving many clock cycles. On the other hand, if an entry within the snoop filter cache 114 is not found (i.e. absence of an entry), then that is an indication that the memory location has been cached by a tile of a remote node and as such, the request is transmitted from the tile 110 to the snoop filter 146 of the GCU 140. In other words, the snoop filter cache 114 locally tracks the lookups that have been cached at tiles of remote nodes 102, 103, . . . , 199, as tracked by the snoop filter 146 of the GCU 140.

It is appreciated that checking the entries of the LLC and then the snoop filter cache sequentially, as described above, is for illustrative purposes. For a non-limiting example, it is appreciated that the LLC may be checked simultaneously while checking the content of the snoop filter cache in parallel.

In some embodiments, the interconnected memory 150 responds with the data associated with the memory access request to tile 110 when the request from the tile 110 is received (i.e. in response to an entry found in the snoop filter cache 114, hence indicating that the data has not been cached by a remote node). Tile 110 may cache the data received from the interconnected memory 150 locally in its LLC 113.

It is appreciated that a new entry may be created for the snoop filter 146 of GCU 140 of the home node 101 when if the GCU response indicates that the line is cached at any remote node, e.g., 102, 103, . . . , 199. In some embodiments, the new entry is created using a controller of the home tile, e.g., tile 110, in the snoop filter 146. It is appreciated that the snoop filter cache 114 also tracks the new entry in the snoop filter 146 (i.e. an entry within the snoop filter cache 114 is removed when a new entry in the snoop filter 146 is created). In some embodiments, if the GCU response including snoop filter hit/miss information indicates that the remote node does not have the line cached, a new entry is inserted into the snoop filter cache of the home node, indicating absence of line at the remote node. As such, a subsequent request initiated by tile 110 results in an entry not being found in the snoop filter cache 114 (i.e. cache miss) indicative of the fact that the memory address may have been cached by a remote node, e.g., node 102, 103, . . . , 199. Accordingly, the memory access request is transmitted from the tile 110 to the snoop filter 146 of the GCU 140. It is appreciated that every tile, e.g., tile 120, . . . , tile 130, in node 101 may operate similar to that of tile 110 and may have components similar to that of tile 110. It is appreciated that remote nodes 102, 103, . . . , 199 may include similar components to that of node 101 and may operate similar to node 101, as described above.

It is appreciated that more than one tile may access the same memory address, e.g., from two different nodes, which may result in invalidation of the cached data in the LLC for all tiles except for the latest tile modifying the data. The entry within the snoop filter of the home node may also be updated based on the invalidation and the new memory access request by the latest tile from another node. As an example, cache line associated with a memory address cached by the LLC 113 of tile 110 is invalidated once another tile of a remote node, e.g., node 102, makes changes to the content of the same memory address (i.e. the cache line within the LLC 113 is invalidated, an entry within the snoop filter cache 114 is removed, and an entry within the snoop filter 146 of the GCU 140 is created). As such, accuracy and integrity of data content is preserved, e.g., subsequent lookup for LLC 113 of tile 110 results in a cache miss if the content associated with that memory address has been subsequently cached by another tile of a remote node, e.g., node 102, node 103, . . . , node 199.

It is appreciated that the snoop filter 146 caches the latest data, e.g., cache line, associated with the memory address being accessed. In other words, if a tile from node 199 modifies the content of the same memory address that was last modified or cached by tile 110 of node 101, then the snoop filter 146 tracks that the content was changed and caches the modification as the most recent cache line and the entry associated with that data within the snoop filter cache 114 is removed such that subsequent memory access request would result in a cache miss to indicate that the data has been cached by a remote node.

Figure 2:
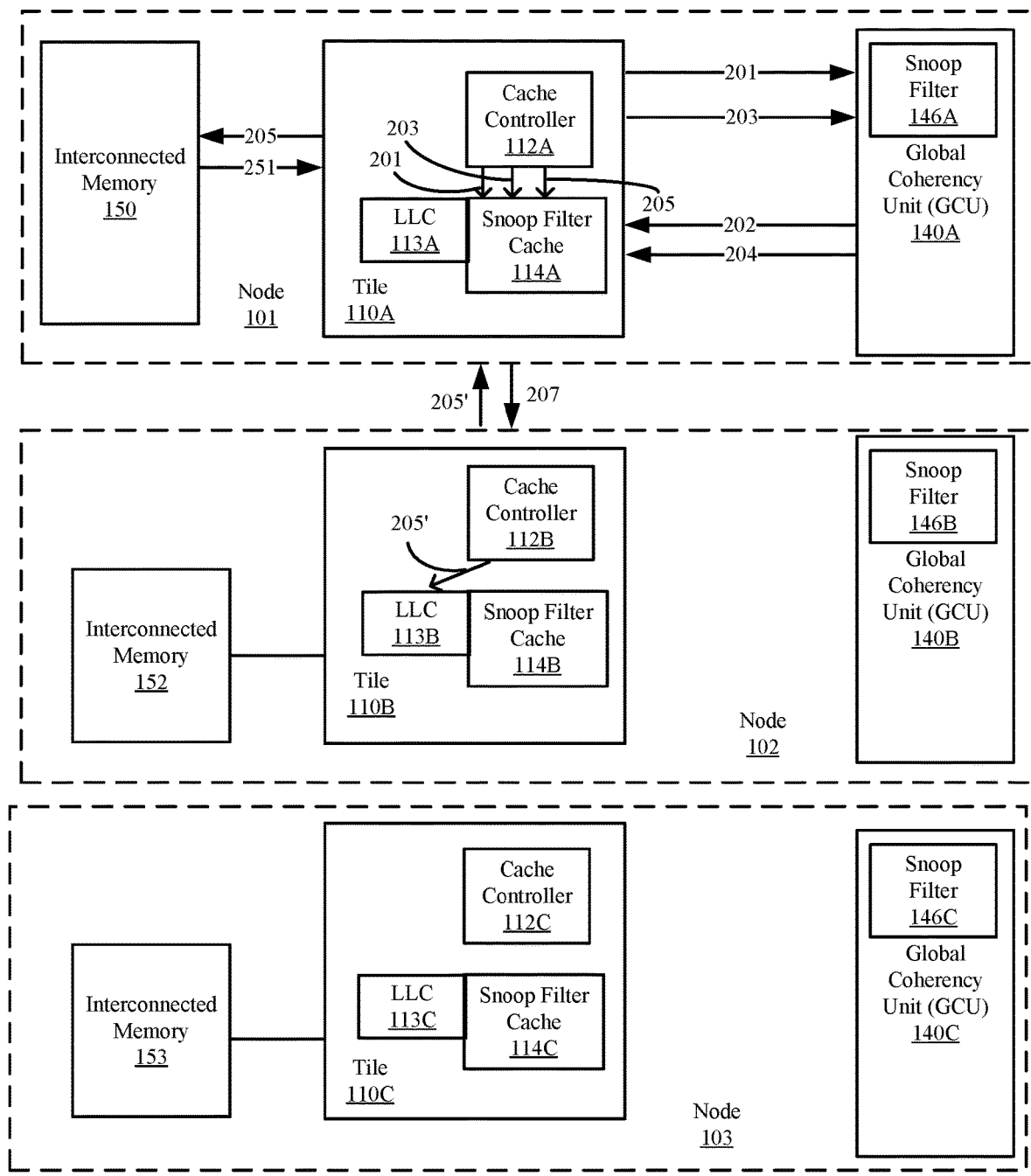
FIG. 2 depicts examples of a communication flow in a hardware-based architecture for reducing global coherence unit snoop filter lookup according to an aspect of the present embodiments.

FIG. 2 depicts an example of a communication flow in a hardware-based architecture for reducing global coherence unit snoop filter lookup according to an aspect of the present embodiments. FIG. 2 is substantially similar to that of FIG. 1 and operates similar to FIG. 1. In this nonlimiting example, only three nodes are shown each with one tile for illustrative purposes. It is appreciated that the node to node interconnect 171, as shown in FIG. 1, is not shown in FIG. 2 to simplify the embodiment and avoid obscuring the communication flow but it is in fact present without being explicitly illustrated in the drawing. The number of nodes and tiles shown is for illustrative purposes only and should not be construed as limiting the scope of the embodiments. For example, each node may include multiple tiles, as described in FIG. 1.

In this nonlimiting example, node 101 includes a tile 110A having a cache controller 112A, LLC 113A, and snoop filter cache 114A, that is connected to the GCU 140A having a snoop filter 146A. The operation of each of these components is described in FIG. 1. Node 102 includes a tile 110B having a cache controller 112B, LLC 113B, and snoop filter cache 114B, that is connected to the GCU 140B having a snoop filter 146B. Node 103 includes a tile 110C having a cache controller 112C, LLC 113C, and snoop filter cache 114C, that is connected to the GCU 140C having a snoop filter 146C.

In this nonlimiting example, a memory access request 201 is generated by tile 110A. The cache controller 112A checks the LLC 113A and the snoop filter cache 114A to determine whether the data associated with the memory access request was previously cached by the LLC 113A or whether it has been cached by a tile within a remote node, e.g., whether the data has been cached in response to access request by tile 110B or 110C of remote nodes 102 or 103.

In this example, there may be a cache miss by the LLC 113A indicating that the data was not previously cached (locally) by tile 110A. However, looking up the information related to the memory access request 201 in the snoop filter cache 114A reveals an absence of entry (i.e. cache miss) associated with the memory address associated with the memory access request 201. In other words, the absence of an entry within the snoop filter cache 114A results in a cache miss indicating that the data has been cached by a remote node. Cache miss within the snoop filter cache 114A is an indication that the memory address was previously looked up a remote node, e.g., node 102, . . . , 103, and cached by the remote node. The data cached by the remote node is tracked via the snoop filter 146A of the GCU 140A. Accordingly, the memory access request 201 is transmitted from tile 110A to the GCU 140A and the snoop filter 146A in order to fetch the latest cached data. It is appreciated that the proposed architecture differs from the conventional systems in many ways including the fact that in the conventional systems request is sent to the GCU 140A and the snoop filter 146A every time there is a memory access request regardless of whether the data has been cached by a remote node or not. Whereas in the proposed architecture, the request is sent to the GCU only when there is an indication that the data associated with the memory address has been cached by a remote node, e.g., node 102, . . . , node 103. The GCU 140A and its snoop filter 146A respond 202 to the received memory access request 201 with the latest data, e.g., latest cache line.

In this example, it is appreciated that if the memory access request 201 would have resulted in a cache hit for LLC 113A then the cache line associated with that would be returned by the LLC 113A and no memory access request would be sent to the GCU 140A or its snoop filter 146A. In other words, sending of a memory access request from the tile 110A to the GCU 140A and its snoop filter 146A would be prevented when there is a cache hit by LLC 113A. Moreover, transmission of the memory access request from the tile 110A to the GCU 140 and its snoop filter 146A is prevented when there is a cache hit in the snoop filter cache 114A indicating that the data has not been cached by a remote node. As such, tens of clock cycles is saved in addition to alleviating bottleneck issues at the GCU 140A.

In this nonlimiting example, a memory access request 203 is generated by tile 110A. The cache controller 112A checks the LLC 113A and the snoop filter cache 114A to determine whether the data associated with the memory access request was previously cached by the LLC 113A or whether it was cached by a remote node, e.g., node 102, . . . , or node 103.

In this example, there may be a cache miss by the LLC 113A indicating that the data was not previously cached (locally) by tile 110A. However, looking up the information related to the memory access request 203 in the snoop filter cache 114A reveals an absence of an entry associated with the memory address associated with the memory access request 203. In one nonlimiting example, the absence of an entry within the snoop filter cache 114A is an indication that the memory address was previously cached by a remote node, and tracked by the snoop filter 146A of the GCU 140A. Accordingly, the memory access request 203 is transmitted from the tile 110A to the GCU 140A and the snoop filter 146A in order to fetch the latest cached data. It is appreciated that the proposed architecture differs from the conventional systems in many ways including the fact that in the conventional systems the request is sent to the GCU 140A and the snoop filter 146A for each memory access request regardless of whether the data has been cached by a remote node or not. In contrast, in the proposed architecture the request is sent to the GCU only when there is an indication that the data associated with the memory address has been cached by a remote node, e.g., node 102, . . . , node 103. The GCU 140A and its snoop filter 146A respond 204 to the received memory access request 203 with the latest data, e.g., latest cache line.

In this example, it is appreciated that if the memory access request 203 would have resulted in a cache hit for LLC 113A then the cache line associated with that would be returned by the LLC 113A and no memory access request would be sent to the GCU 140A or its snoop filter 146A. In other words, sending of a memory access request from the tile 110A to the GCU 140A and its snoop filter 146A would have been prevented when there is a cache hit by LLC 113A. Moreover, transmission of the memory access request from the tile 110A to the GCU 140 and its snoop filter 146A is prevented when there is a cache hit in the snoop filter cache 114A indicating that the data has not been cached by a remote node. As such, tens of clock cycles are saved in addition to alleviating bottleneck issues at the GCU 140A.

In this nonlimiting example, a memory access request 205 is generated by tile 110A. The cache controller 112A checks the LLC 113A and the snoop filter cache 114A to determine whether the data associated with the memory access request was previously cached by the LLC 113A or whether it was cached by a tile of a remote node, e.g., node 102, . . . , node 103.

In this example, there may be a cache miss by the LLC 113A indicating that the data was not previously locally cached by tile 110A. Additionally, in this nonlimiting example, looking up the information related to the memory access request 205 in the snoop filter cache 114A reveals that an entry associated with the snoop filter cache associated with the memory access request 205 is present (i.e. cache hit). Accordingly, there is a cache hit in the snoop filter cache 114A and it is determined that no other tile in a remote node, e.g., tiles 110B or 110C of remote nodes 102 or 103, have cached that memory address. As such, it is determined that the snoop filter 146A has no cache line associated with that memory address. Accordingly, unlike the conventional systems no memory access request is sent to the GCU 140A or its snoop filter 146A. Instead, the memory access request 205 is transmitted to the interconnected memory 150, which responds 251 with the data, e.g., cache line, associated therewith. The data, e.g., cache line, may be cached by the LLC 113A.

In one nonlimiting example, another memory access request 205' is generated by tile 110B of node 102 subsequent to memory access request 205 for the same memory address as the memory access request 205. In other words, tile 110B of node 102 is a remote node to node 101 that is requesting memory access from node 102. In some nonlimiting examples, the memory access request 205' is transmitted from node 102 to node 101. The memory address associated with the request is released, as was previously cached by LLC 113A of node 101, and a new entry is created in the snoop filter 146A of GCU 140A in node 101 by the controller of tile 110A. The new entry in the snoop filter 146A causes the entry in the snoop filter cache 114A to be removed in order to cause a cache miss by the snoop filter cache 114A when a subsequent memory access request is received to determine that the data is cached by a remote node (i.e. node 102). In other words, new entries are created within the snoop filter 146A of the GCU 140A in the home node 101 when the data associated with an address line within the home node is being accessed by a remote node. The data associated with the memory access request 205' is returned 207 from node 101 to the requesting node 102 and tile 110B. It is appreciated that node 102 operates substantially similar to that of node 101, as described above, when the memory access request is to access data associated with an address within its corresponding interconnected memory 152. Similarly it is appreciated that node 103 operates substantially similar to that of node 101, as described above, when the memory access request is to access data associated with an address within its corresponding interconnected memory 153.

Figure 3:
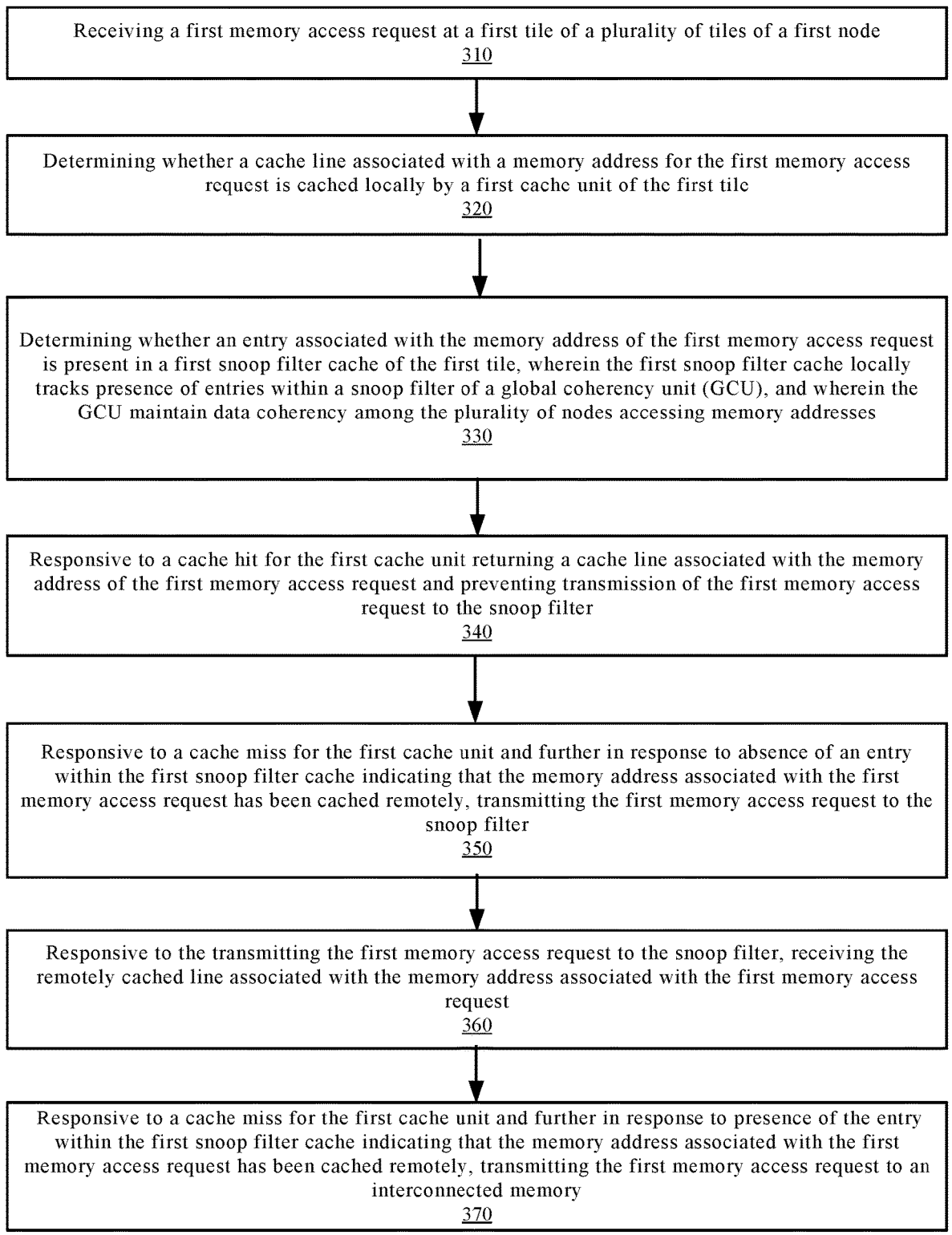
FIG. 3 depicts a flowchart of an example of a process to a hardware-based architecture for reducing global coherence unit snoop filter lookup according to an aspect of the present embodiments.

FIG. 3 depicts a flowchart of an example of a process to a hardware-based architecture for reducing global coherence unit snoop filter lookup, according to an aspect of the present embodiments. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, at step 310, a first memory access request at a first tile of a plurality of tiles of a first node is received, as described in FIGS. 1-2. At step 320, it is determined whether a cache line associated with a memory address for the first memory access request is cached locally by a first cache unit, e.g., LLC unit, of the first tile, as described above. At step 320, it is determined whether an entry associated with the memory address of the first memory access request is present in a first snoop filter cache, e.g., an SRAM, of the first tile. It is appreciated that the first snoop filter cache locally tracks presence or absence of entries within a snoop filter of a GCU. In one nonlimiting implementation, the snoop filter cache tracks the absent state. It is further appreciated that the GCU maintains data coherency among the plurality of nodes accessing memory addresses. At step 340, responsive to a cache hit for the first cache unit, a cache line associated with the memory address of the first memory access request is returned and transmission of the first memory access request to the snoop filter is prevented, as described in FIGS. 1 and 2. At step 350, in response to a cache miss for the first cache unit and further in response to absence of an entry within the first snoop filter cache that indicating that the memory address associated with the first memory access request has been cached by a remote node, the first memory access request is transmitted to the snoop filter, as described above in FIGS. 1 and 2. At step 360, responsive to transmitting the first memory access request to the snoop filter, a remotely-cached line associated with the memory address associated with the first memory access request is received. At step 370, in response to a cache miss for the first cache unit and further in response to presence of the entry within the first snoop filter cache indicating that the memory address associated with the first memory access request has not been cached by a remote node, the first memory access request is transmitted to an interconnected memory component, e.g., DRAM, and transmission of the first memory access request to the snoop filter is prevented, as described above. It is appreciated that a cache line associated with the transmission of the first memory access request to the interconnected memory component is received from the interconnected memory component.

As described above, determining a cache hit/miss and further determining whether an entry is present within a snoop filter cache may be performed in chronological order (hence sequentially) or in parallel.

It is appreciated that subsequent memory access requests, e.g., a second memory access request for an address space associated with the first tile of the first node, may be received by the first tile (either initiated by the first tile or by tiles from a remote node, e.g., a tile of a second node). It is appreciated that the process steps described above may be repeated for the second memory access request initiated by the first tile of the first node. If the second memory access request is initiated by a tile from a remote node, e.g., second tile of a second node, then a controller from the first tile creates an entry within the snoop filter of the GCU of the first node. The created entry in the snoop filter of the GCU indicates that the data associated with second memory access request has been cached by a tile of a remote node. The entry in the first snoop filter cache of the first tile is removed. As such, any subsequent memory request to the same address space results in a cache miss from the first snoop filter cache, indicating that the data associated therewith has been cached by a tile of a remote node such that the request can be transmitted to the GCU and the snoop filter for fetching the cached data. The data associated with the second memory access request is transmitted from the first node to the second tile of the second node. It is appreciated that if cache lines associated with the second memory access request has been locally cached by the cache unit of the first tile, then the cached data in the first tile is invalidated.

It is appreciated that the number of requests transmitted to the snoop filter and the GCU is reduced because presence of a memory address within the snoop filter is locally checked, e.g., by tracking it in a snoop filter cache within each tile, and the request is sent to the GCU and the snoop filter only if lookup in the snoop filter cache results in an entry not to be found (i.e. cache miss). As such, unnecessary requests are no longer sent to the snoop filter, thereby saving tens of clock cycles. Furthermore, since the number of requests to the GCU and the snoop filter is reduced, the bottleneck at the GCU is also improved.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:
    a plurality of nodes in the system, wherein each node of the plurality of nodes comprises at least one or more tiles wherein each tile covers a plurality of lines in a memory address space and wherein the each node further comprises a global coherency unit (GCU); and
    wherein a GCU of a first node is configured to maintain data coherency among the plurality of nodes by tracking lines cached at remote nodes, wherein the remote nodes are nodes of the plurality of nodes other than the first node; wherein
    a first tile of the at least one or more tiles in the first node comprises:
        a first cache unit configured to locally cache lines associated with memory address space covered by the first tile; and
        a first snoop filter cache configured to track entries within a snoop filter of the GCU of the first node, wherein presence of the entries in the first snoop filter cache indicates absence of the entries by the snoop filter of the GCU of the first node.

2. The system of claim 1, wherein the first tile further includes a first cache controller configured to check whether the line has been cached in the first cache unit.

3. The system of claim 1, wherein the first tile further includes a first cache controller configured to check the first snoop filter cache to determine whether the line has been cached by the snoop filter of the GCU of the first node at a remote node.

4. The system of claim 1, wherein the first tile further includes a first cache controller configured to transmit a memory access request to the GCU to retrieve and return a line cached at the remote node in response to absence of an entry associated with the line in the first snoop filter cache.

5. The system of claim 1, wherein the first tile further includes a first cache controller configured to retrieve and return a line for the first tile without transmitting a memory access request to the GCU in response to presence of the entry associated with the line in the first snoop filter cache.

6. The system of claim 1, wherein responsive to a memory access request the first cache unit and the first snoop filter cache are checked sequentially.

7. The system of claim 1, wherein responsive to a memory access request the first cache unit and the first snoop filter cache are checked in parallel to one another.

8. The system of claim 1, wherein an interconnected memory is accessed in response to a cache miss by the first cache unit and further in response to presence of the entry associated with line in the first snoop filter cache.

9. The system of claim 8, wherein transmission of a memory access request to the snoop filter is prevented in response to a cache miss by the first cache unit and further in response to the presence of the entry associated with the line in the first snoop filter cache.

10. The system of claim 1, wherein a new entry is created in the snoop filter of the GCU of the first node in response to a memory access request by a remote node to the first node.

11. The system of claim 1, wherein the plurality of nodes are sockets in a multi-socket system.

12. The system of claim 1, wherein the first cache unit is an L3 cache unit.

* * * * *